(12) United States Patent
Slovacek

(10) Patent No.: US 10,326,881 B2
(45) Date of Patent: Jun. 18, 2019

(54) AUTOMATED SCHEDULING OF CONTACT CENTER AGENTS USING REAL-TIME ANALYTICS

(71) Applicant: ZOOM International a.s., Prague (CZ)

(72) Inventor: Vaclav Slovacek, Prague (CZ)

(73) Assignee: ZOOM International a.s., Prague (CZ)

( * ) Notice: Subject to any disclaimer, the term of this patent is extended or adjusted under 35 U.S.C. 154(b) by 0 days.

(21) Appl. No.: 15/278,030

(22) Filed: Sep. 28, 2016

(65) Prior Publication Data
US 2018/0091651 A1    Mar. 29, 2018

(51) Int. Cl.
| | | |
|---|---|---|
| *H04M 3/51* | (2006.01) | |
| *H04M 3/00* | (2006.01) | |
| *G06Q 10/06* | (2012.01) | |
| *H04M 5/00* | (2006.01) | |
| *H04L 12/66* | (2006.01) | |

(52) U.S. Cl.
CPC .... *H04M 3/5175* (2013.01); *G06Q 10/06311* (2013.01); *H04M 2203/402* (2013.01)

(58) Field of Classification Search
CPC ............. H04M 3/5233; H04M 3/5175; H04M 3/5232; H04M 3/5183; H04M 3/5191; H04M 2203/551; H04M 3/2218; H04M 2203/402; H04M 2201/54; H04M 2203/2072; H04M 2203/401; H04M 2203/556; H04M 1/2535; G06Q 10/0631; G06Q 10/063112; G06Q 10/1093; G06Q 10/06311

USPC ........... 379/265.09, 265.12, 265.11, 265.03, 379/265.06, 266.07, 265.02, 265.05, 379/265.07, 265.13, 266.08

See application file for complete search history.

(56) References Cited

U.S. PATENT DOCUMENTS

| | | | | |
|---|---|---|---|---|
| 7,739,115 B1 * | 6/2010 | Pettay | ..................... | G10L 15/26 379/265.06 |
| 8,488,769 B1 * | 7/2013 | Noble, Jr. | ........... | H04M 3/5175 379/265.02 |
| 8,644,489 B1 * | 2/2014 | Noble, Jr. | ........... | H04M 3/5175 379/265.03 |
| 8,811,598 B2 | 8/2014 | Fagundes | | |
| 8,825,507 B1 * | 9/2014 | Ginda | ................ | G06Q 10/1095 379/265.05 |
| 9,020,920 B1 * | 4/2015 | Haggerty | ................ | G06F 17/30 707/705 |
| 9,225,833 B1 * | 12/2015 | Koster | ................ | H04M 3/5175 |
| 2006/0210034 A1 * | 9/2006 | Beadle | ................ | G06Q 10/107 379/88.22 |
| 2006/0212336 A1 * | 9/2006 | Powers | .................. | G06Q 10/06 705/7.16 |
| 2007/0002744 A1 * | 1/2007 | Mewhinney | ........ | H04M 3/5175 370/235 |

(Continued)

*Primary Examiner* — Fan S Tsang
*Assistant Examiner* — Kharye Pope
(74) *Attorney, Agent, or Firm* — Brian R. Galvin; Brian S. Boon; Galvin Patent Law, LLC

(57) ABSTRACT

A system for automatically scheduling contact center agents using real-time analytics, comprising an analytics server that receives and analyzes interaction information, a scheduling server that produces scheduling events based on the analysis, and a queuing server that modifies a current state of agent workstations based on the scheduling events, and a method for system for automatically scheduling contact center agents using real-time analytics.

5 Claims, 9 Drawing Sheets

(56) References Cited

U.S. PATENT DOCUMENTS

| | | | | |
|---|---|---|---|---|
| 2007/0195944 | A1* | 8/2007 | Korenblit | G06Q 10/06 379/265.06 |
| 2008/0075268 | A1* | 3/2008 | Medina | H04M 3/5175 379/265.06 |
| 2009/0089135 | A1* | 4/2009 | Minert | G06Q 10/06311 705/7.13 |
| 2010/0158239 | A1* | 6/2010 | Anisimov | H04M 3/51 379/266.07 |
| 2010/0165977 | A1* | 7/2010 | McCord | H04L 12/66 370/352 |
| 2012/0197678 | A1* | 8/2012 | Ristock | G06Q 10/06 705/7.15 |
| 2014/0140495 | A1* | 5/2014 | Ristock | H04M 3/5232 379/265.05 |
| 2014/0200941 | A1* | 7/2014 | McDaniel | G06Q 10/063116 705/7.16 |
| 2014/0337072 | A1* | 11/2014 | Tamblyn | G06Q 10/06311 705/7.13 |
| 2014/0355748 | A1* | 12/2014 | Conway | H04M 3/5233 379/265.1 |
| 2015/0049869 | A1* | 2/2015 | Petrovykh | H04M 3/5158 379/265.09 |
| 2015/0078547 | A1* | 3/2015 | Walls | H04M 3/5233 379/265.09 |
| 2015/0098561 | A1* | 4/2015 | Etison | H04M 3/5175 379/265.06 |
| 2015/0074170 | A1 | 5/2015 | Steiner et al. | |
| 2015/0350435 | A1* | 12/2015 | Connolly | G06Q 30/0631 379/265.03 |
| 2015/0381807 | A1* | 12/2015 | Konig | H04M 3/5175 379/265.06 |
| 2015/0381809 | A1* | 12/2015 | Fleming | H04M 3/5158 379/265.11 |
| 2016/0100059 | A1* | 4/2016 | Skiba | H04M 3/5175 379/265.06 |
| 2016/0191712 | A1* | 6/2016 | Bouzid | H04M 3/5232 379/265.12 |
| 2016/0381222 | A1* | 12/2016 | Ristock | H04M 3/5191 379/265.09 |

* cited by examiner

AUTOMATED SCHEDULING OF CONTACT CENTER AGENTS USING REAL-TIME ANALYTICS

CROSS-REFERENCE TO RELATED APPLICATIONS

None.

BACKGROUND OF THE INVENTION

Field of the Art

The disclosure relates to the field of contact center operations, and more particularly to the field of scheduling contact center agents automatically using real-time analytics.

Discussion of the State of the Art

In the art of contact center operation, agents are scheduled individually for optimum performance, taking into consideration time for training and meetings as well as follow-up with ongoing customer interactions such as for outbound "callbacks", as well as agent availability when they are scheduled to work and be available for new interactions such as being in an active telephone queue to receive customer calls. However, agent performance on a per-interaction basis cannot be accounted for in scheduling, and many interactions may be affected by poor training or technical issues before the issue can be corrected with current scheduling methods.

What is needed, is a means to monitor and analyze interactions, use this analysis to generate scheduling changes, and implement scheduling changes automatically in real-time to further optimize agent performance accounting for each interaction as they occur.

SUMMARY OF THE INVENTION

Accordingly, the inventor has conceived and reduced to practice, in a preferred embodiment of the invention, a system and method for automatically scheduling contact center agents using real-time analytics.

According to a preferred embodiment of the invention, a system for automatically scheduling contact center agents using real-time analytics, comprising an analytics server comprising at least a plurality of programming instructions stored in a memory and operating on a processor of a network-connected computing device and configured to receive at least a plurality of interaction-specific information from a plurality of contact center systems, and configured to analyze at least a portion of the plurality of interaction-specific information, and configured to provide at least a portion of the analysis results to a scheduling server; a scheduling server comprising at least a plurality of programming instructions stored in a memory and operating on a processor of a network-connected computing device and configured to maintain a schedule for each of a plurality of contact center agents, the schedule comprising at least a plurality of work items and a plurality of time-based scheduling information, and configured to receive a plurality of analysis information from an analytics server, and configured to produce a plurality of scheduling events based at least in part on at least a portion of the received analysis information, and configured to operate on at least an agent schedule based at least in part on a portion of the plurality of scheduling events; and an agent queueing server comprising at least a plurality of programming instructions stored in a memory and operating on a processor of a network-connected computing device and configured to receive at least a plurality of agent-specific information from a plurality of agent workstations, the agent-specific information comprising at least an agent's current status, and configured to operate on at least a portion of a plurality of agent workstations to configure at least an agent's current status, the configuration being based at least in part on an agent schedule, is disclosed.

According to another preferred embodiment of the invention, a method for automatically scheduling contact center agents using real-time analytics, comprising the steps of receiving, at an analytics server comprising at least a plurality of programming instructions stored in a memory and operating on a processor of a network-connected computing device and configured to receive at least a plurality of interaction-specific information from a plurality of contact center systems, and configured to analyze at least a portion of the plurality of interaction-specific information, and configured to provide at least a portion of the analysis results to a scheduling server, a plurality of interaction-specific information; analyzing at least a portion of the interaction-specific information; producing, using a scheduling server comprising at least a plurality of programming instructions stored in a memory and operating on a processor of a network-connected computing device and configured to maintain a schedule for each of a plurality of contact center agents, the schedule comprising at least a plurality of work items and a plurality of time-based scheduling information, and configured to receive a plurality of analysis information from an analytics server, and configured to produce a plurality of scheduling events based at least in part on at least a portion of the received analysis information, and configured to operate on at least an agent schedule based at least in part on a portion of the plurality of scheduling events, a plurality of scheduling events based at least in part on at least a portion of the analysis results; receiving, at an agent queueing server comprising at least a plurality of programming instructions stored in a memory and operating on a processor of a network-connected computing device and configured to receive at least a plurality of agent-specific information from a plurality of agent workstations, the agent-specific information comprising at least an agent's current status, and configured to operate on at least a portion of a plurality of agent workstations to configure at least an agent's current status, the configuration being based at least in part on an agent schedule, at least a portion of the plurality of scheduling events; and modifying the current state of at least a portion of a plurality of agent workstations, the modification being based at least in part on at least a portion of the plurality of scheduling events, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
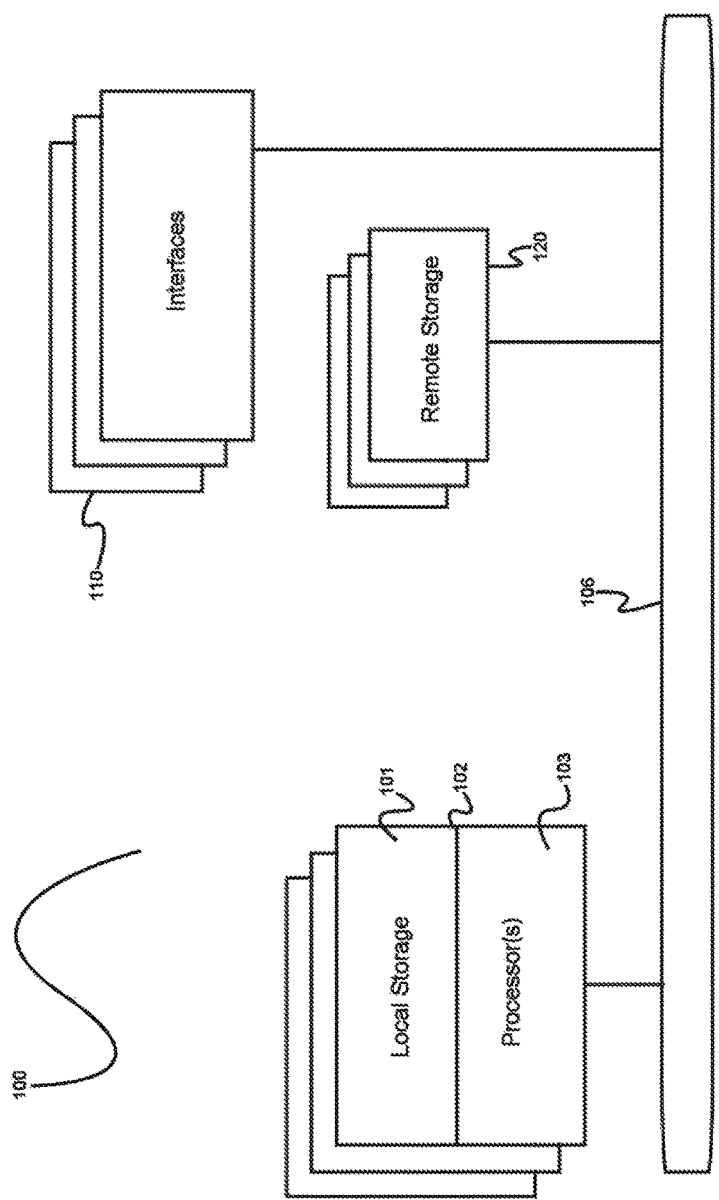
FIG. 1 is a block diagram illustrating an exemplary hardware architecture of a computing device used in an embodiment of the invention.

The inventor has conceived, and reduced to practice, in a preferred embodiment of the invention, a system and method for automatically scheduling contact center agents using real-time analytics.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
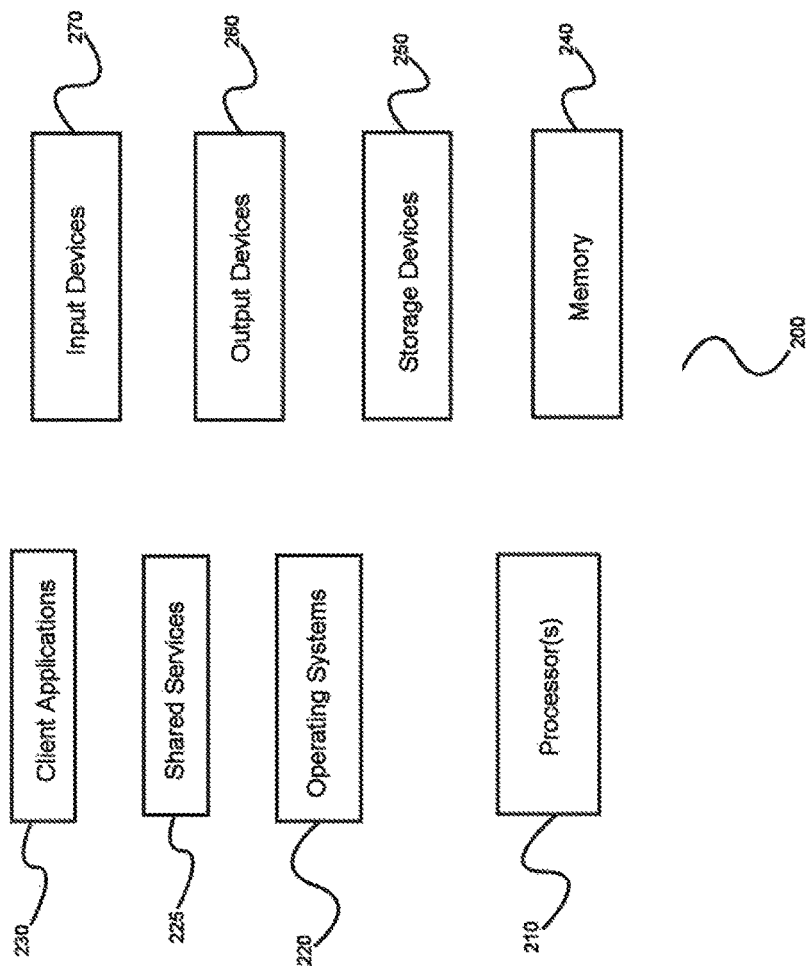
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
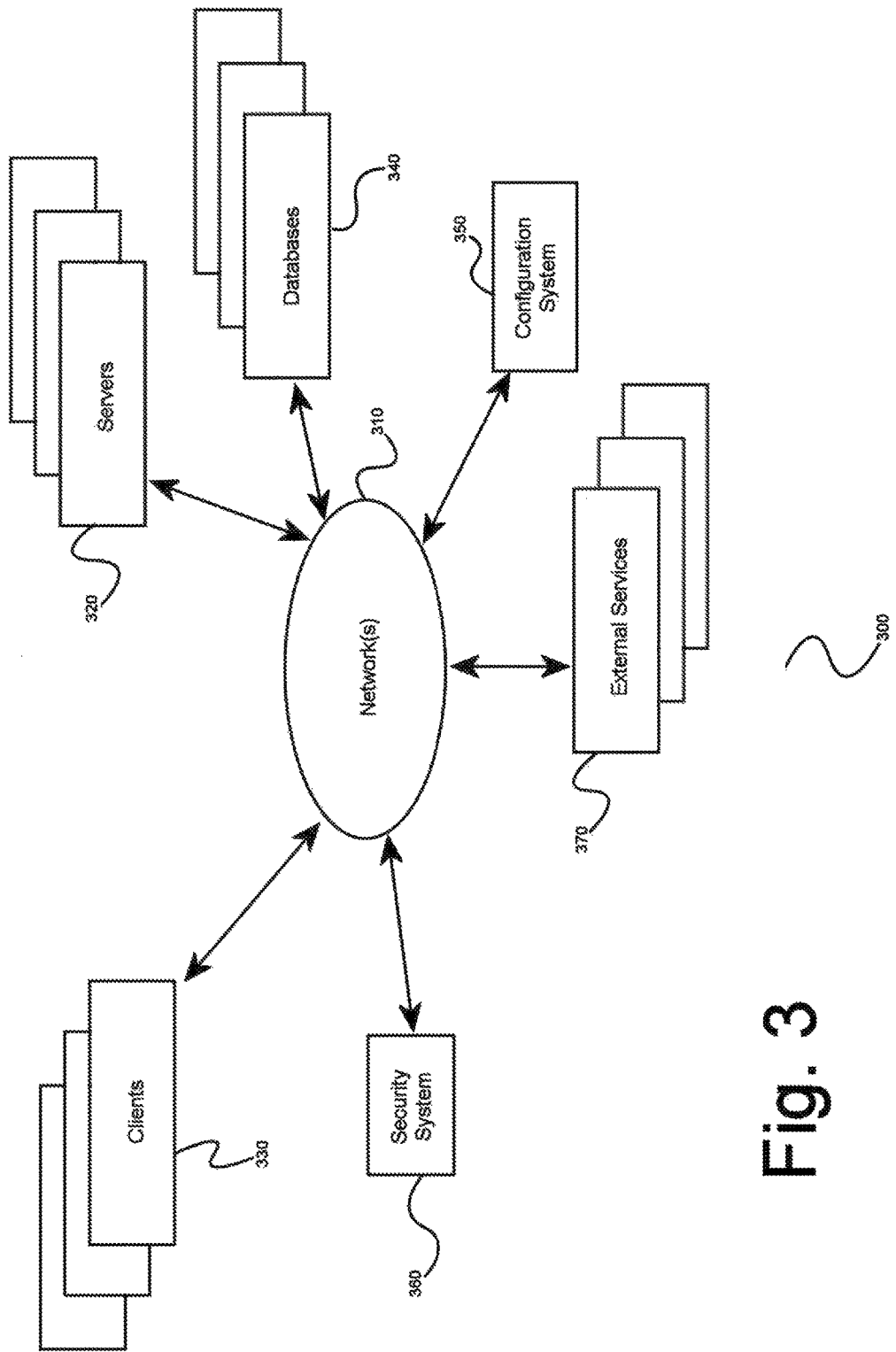
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
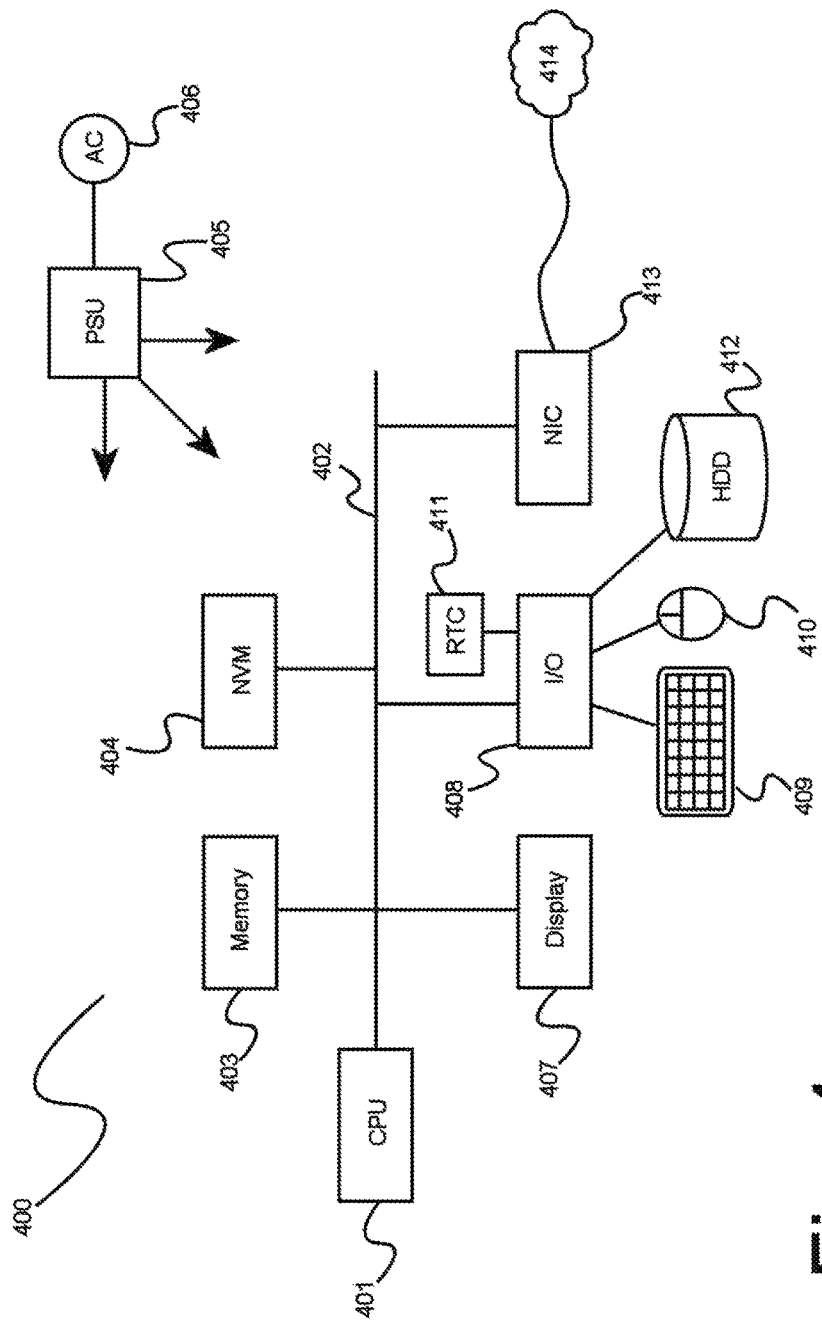
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
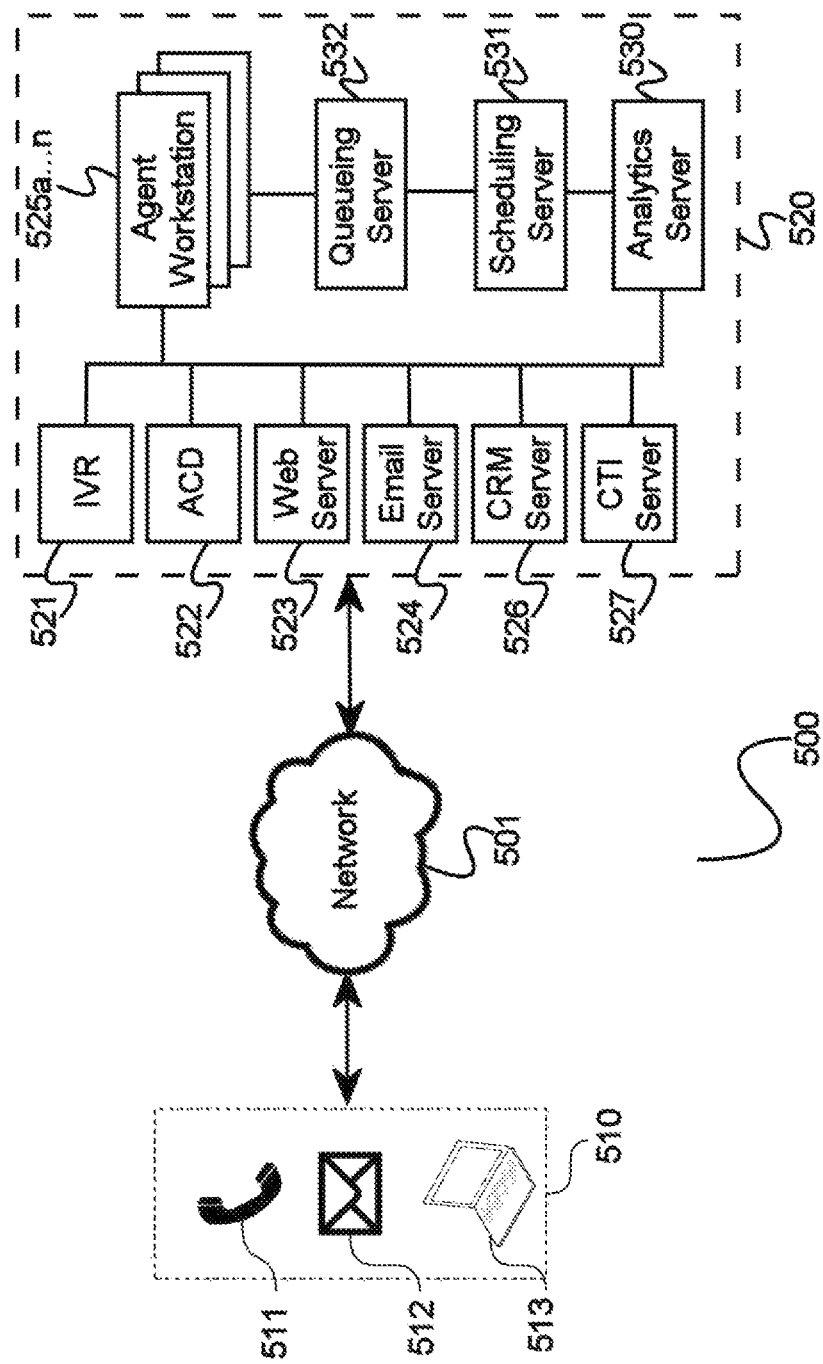
FIG. 5 is a block diagram of an exemplary system architecture for automatically scheduling contact center agents using real-time analytics, according to a preferred embodiment of the invention.

FIG. 5 is a block diagram of an exemplary system architecture 500 for automatically scheduling contact center agents using real-time analytics, according to a preferred embodiment of the invention. According to the embodiment, a variety of client devices 510 such as a telephone 511, email 512, or personal computer 513 may communicate with a contact center 520 via a network 501 such as the Internet or other suitable communication network. According to the nature of a particular client device or interaction, various contact center system components may be utilized to handle the interaction, for example a telephone call may be received and processed by a computer telephony integration (CTI) server 527 that may provide the interaction to one or more of a plurality of contact center agent workstations 525a-n for handling, email interaction may be received and routed by an email server 524 to an email client or other software operating on an agent workstation 525a-n, web-based interaction such as instant messages or other chat interaction may be received and routed by a web server 523 to chat software operating on an agent workstation 525a-n, or a telephone caller may interact with an interactive voice response (IVR) system 521 and interact with various prompts as is a common practice in the art, and the call interaction may then be processed by an automated call distributor (ACD) 522 and provided to an agent 525a-n for handling. For example, a telephone interaction may be provided to a single agent for direct interaction with a customer, or an email interaction may be provided to a group of agents for resolution, such as when multiple tasks need to be performed in parallel or when a collaborative effort may be required.

According to the embodiment, a scheduling server 531 may be utilized, comprising at least a plurality of programming instructions stored in a memory 403 and operating on a processor 401 of a network-connected computing device 400 (as described above, referring to FIG. 4) and configured to maintain and operate on a plurality of agent schedules, for example comprising agent availability times when an agent is scheduled to work and be available to receive interactions, meetings, training sessions, or other such events. A queueing server 532 may be used, comprising at least a plurality of programming instructions stored in a memory 403 and operating on a processor 401 of a network-connected computing device 400 (as described above, referring to FIG. 4) and configured to monitor the current state of agents, and to operate on agent states, for example to update agent availability, skills, training, language capabilities, or any other agent-specific state information that may be relevant within a contact center environment such as for making routing determinations for inbound interactions. Scheduling server 531 may operate on a schedule through the use of scheduling events, wherein a scheduling event comprises a particular change to be made to a schedule for a particular agent (that is, each scheduling event corresponds to a single discrete scheduling change to be performed). These scheduling events may also be provided to a queueing server 532 that may then directly alter an agent's current state based on a received scheduling event, for example to automatically place an agent in an unavailable state (so they no longer receive interactions) so they may receive "on the fly" training, or to automatically update an agent's associated skill sets to reflect recent training received or a reorganization of skill descriptions (or any other such skills-related change that may necessitate altering an agent's state), so that they may immediately begin participating in interactions associated with the new skills.

According to the embodiment, an analytics server 530 may be utilized, comprising at least a plurality of programming instructions stored in a memory 403 and operating on a processor 401 of a network-connected computing device 400 (as described above, referring to FIG. 4) and configured to receive and analyze interaction information from various contact center systems as described above, and to provide the results of analysis to a scheduling server 531 for use in producing schedule events (such as to update an agent schedule based on the details of a particular interaction, as described below). For example, analytics server 530 may receive email-based interaction information pertaining to a particular interaction being handled by an agent, and may identify certain key words or phrases within the interaction such as date or time information (for example, if a customer sends an email message as part of an interaction, requesting contact within a specific time window), or that may have been configured as indicators of agent-specific scheduling events such as training or collaboration. For example, if a customer's messages indicate they are dissatisfied with an agent's assistance with an issue concerning a particular product, a scheduling event for additional training regarding that product may be produced by scheduling server 531 based on these analysis results.

In this manner, analysis may be performed on historical or stored interaction information as well as "live" or real-time interaction information for interactions that may be currently in progress or immediately after their completion. Scheduling changes may be automatically implemented based on analysis, for example to automatically schedule agents for new training, meetings or other collaboration, outbound interactions or follow-ups, or other such events. In addition, real-time scheduling changes may be made as needed and agent states directly updated to enable immediate scheduling changes, for example enabling automated immediate-action training. For example, if an agent becomes strident with a customer or triggers specific key words or phrases (for example, as identified via speech analysis), they may be immediately placed in an unavailable state and scheduled for immediate training to correct any performance issues before they participate in any further interactions. Additionally, analysis may optionally produce scheduling events based on prediction data, for example analyzing a body of existing data to identify scheduling changes that may improve operation or agent performance, and then proactively modifying agent schedules and current states to implement the changes rather than waiting and reactively apply them at a later time (potentially after interactions have been negatively impacted by the delay).

DETAILED DESCRIPTION OF EXEMPLARY EMBODIMENTS

Figure 6:
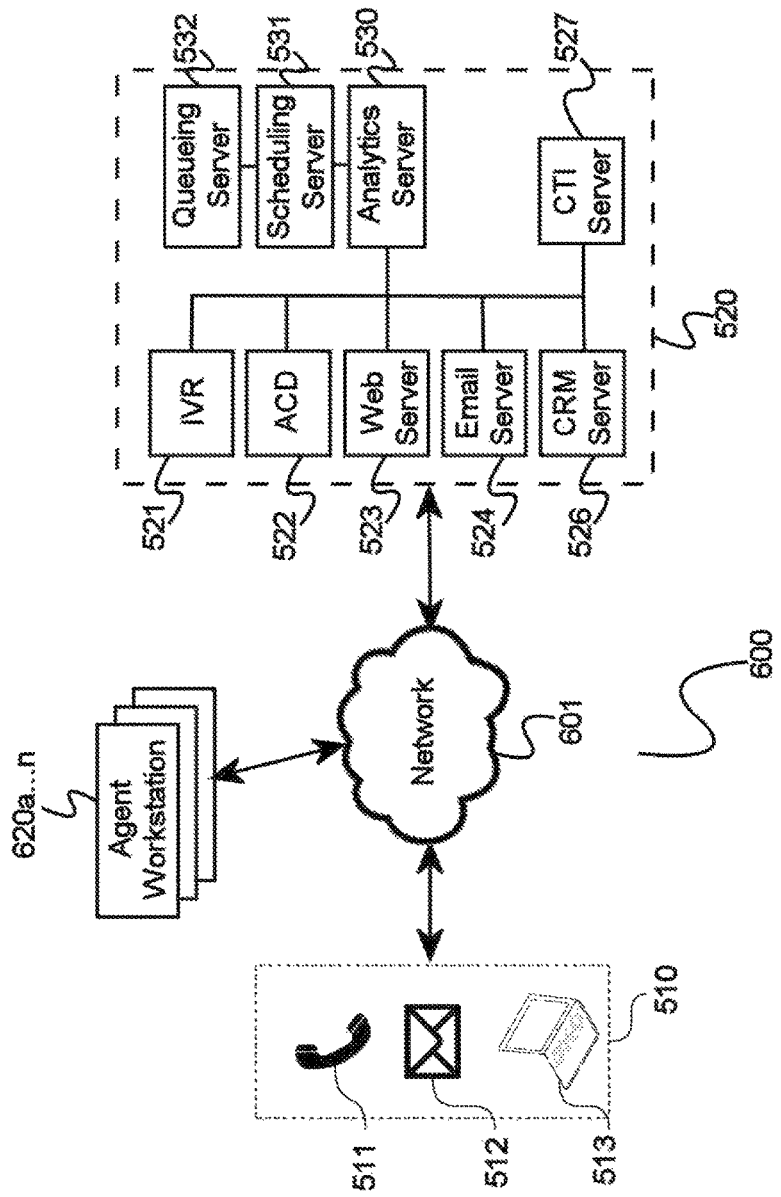
FIG. 6 is a block diagram of an exemplary system architecture for automatically scheduling contact center agents using real-time analytics, illustrating the use of distributed agents communicating via a network.

FIG. 6 is a block diagram of an exemplary system architecture 600 for automatically scheduling contact center agents using real-time analytics, illustrating the use of distributed system agents communicating via a network. According to the embodiment, a variety of client devices 510 such as a telephone 511, email software application 512, or personal computer 513 may communicate with a contact center 520 via a network 601 such as the Internet or other suitable communication network. According to the nature of a particular client device or interaction, various contact center system components may be utilized to handle the interaction, for example a telephone call may be received and processed by a computer telephony integration (CTI) server 527 that may provide the interaction to one or more of a plurality of contact center agent workstations 620*a-n* for handling, email interaction may be received and routed by an email server 524 to an email client or other software operating on an agent workstation 620*a-n*, web-based interaction such as instant messages or other chat interaction may be received and routed by a web server 523 to chat software operating on an agent workstation 620*a-n*, or a telephone caller may interact with an interactive voice response (IVR) system 521 and interact with various prompts as is a common practice in the art, and the call interaction may then be processed by an automated call distributor (ACD) 522 and provided to an agent 620*a-n* for handling. For example, a telephone interaction may be provided to a single agent for direct interaction with a customer, or an email interaction may be provided to a group of agents for resolution, such as when multiple tasks need to be performed in parallel or when a collaborative effort may be required. A scheduling server 531 may be utilized to maintain and operate on a plurality of agent schedules, for example comprising agent availability times when an agent is scheduled to work and be available to receive interactions, meetings, training sessions, or other such events. A queueing server 532 may be used to monitor the current state of agents, and to operate on agent states, for example to update agent availability, skills, training, language capabilities, or any other agent-specific state information that may be relevant within a contact center environment such as for making routing determinations for inbound interactions. Scheduling server 531 may operate on a schedule through the use of scheduling events, wherein a scheduling event comprises a particular change to be made to a schedule for a particular agent (that is, each scheduling event corresponds to a single discrete scheduling change to be performed). These scheduling events may also be provided to a queueing server 532 that may then directly alter an agent's current state based on a received scheduling event, for example to automatically place an agent in an unavailable state (so they no longer receive interactions) so they may receive "on the fly" training, or to automatically update an agent's associated skill sets to reflect recent training received or a reorganization of skill descriptions (or any other such skills-related change that may necessitate altering an agent's state), so that they may immediately begin participating in interactions associated with the new skills.

According to the embodiment, a plurality of distributed agent workstations 620*a-n* may communicate via network 501 to interact with systems operated by contact center 520, for example, to receive customer account information from CRM server 526 or to participate in a customer interaction received by contact center 520 such as a phone call via an IVR 521. In such an arrangement, agent workstations 620a-n may provide interaction information via network 501, such as periodically sending status updates or events that may contain details of an ongoing interaction, or they may optionally be monitored in real-time such as through the use of screen-sharing or audio listening. Agent workstations 620a-n may also receive scheduling and status updates via network 601 to facilitate automated scheduling and queueing as described previously, referring to FIG. 5. In this manner it may be appreciated that automated analysis and scheduling may be utilized both in traditional contact center environments (that is, where agents are located within a physical contact center and may generally communicate via a shared internal network) or in distributed or cloud-based contact center arrangements where agents may operate form any geographic location via network communication.

Figure 7:
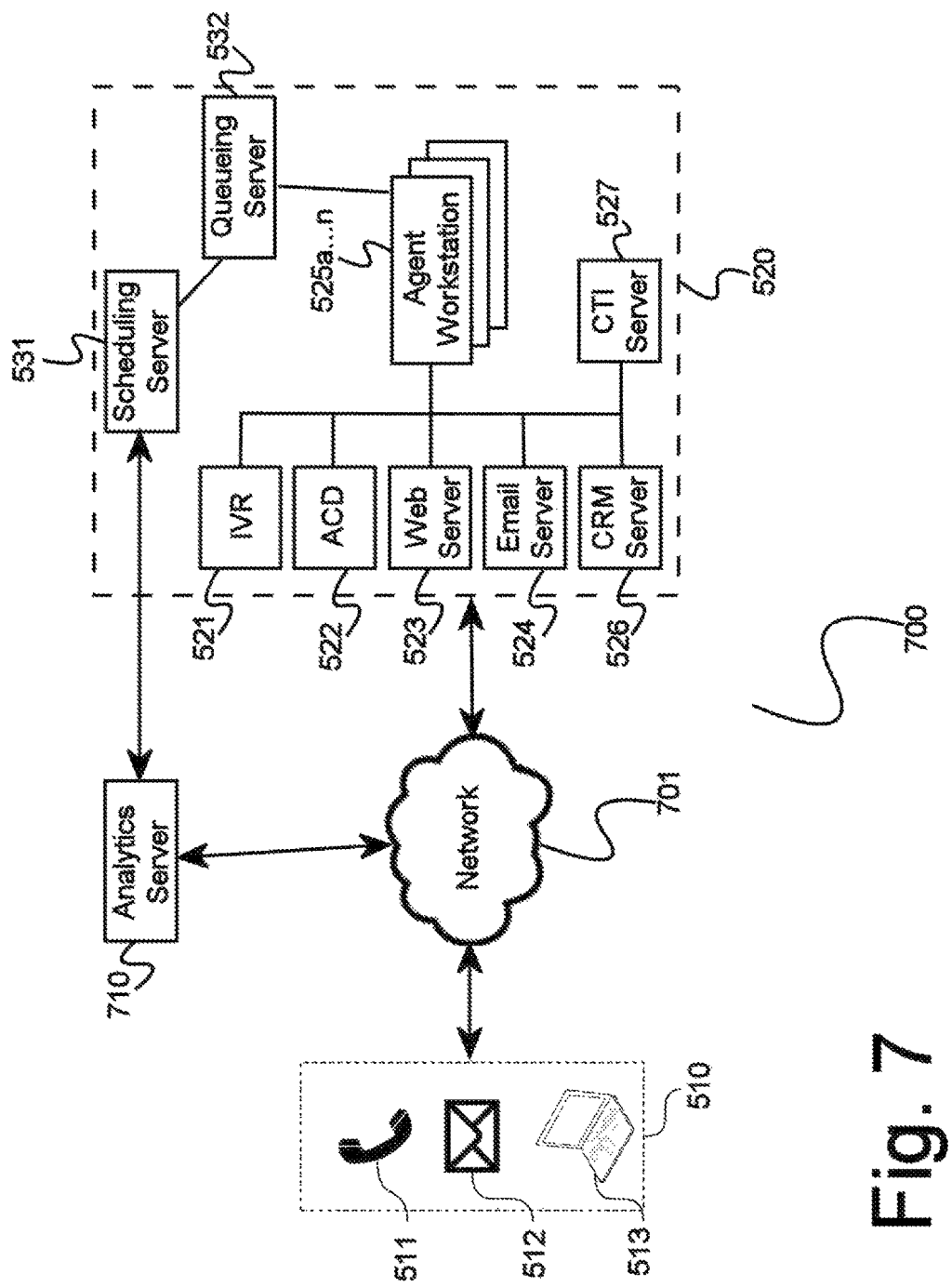
FIG. 7 is a block diagram of an exemplary system architecture for automatically scheduling contact center agents using real-time analytics, illustrating the use of off-site analytics via a software-as-a-service arrangement.

FIG. 7 is a block diagram of an exemplary system architecture 700 for automatically scheduling contact center agents using real-time analytics, illustrating the use of off-site analytics via a software-as-a-service arrangement. According to the embodiment, a variety of client devices 510 such as a telephone 511, email software application 512, or personal computer 513 may communicate with a contact center 520 via a network 701 such as the Internet or other suitable communication network. According to the nature of a particular client device or interaction, various contact center system components may be utilized to handle the interaction, for example a telephone call may be received and processed by a computer telephony integration (CTI) server 527 that may provide the interaction to one or more of a plurality of contact center agent workstations 525a-n for handling, email interaction may be received and routed by an email server 524 to an email client or other software operating on an agent workstation 525a-n, web-based interaction such as instant messages or other chat interaction may be received and routed by a web server 523 to chat software operating on an agent workstation 525a-n, or a telephone caller may interact with an interactive voice response (IVR) system 521 and interact with various prompts as is a common practice in the art, and the call interaction may then be processed by an automated call distributor (ACD) 522 and provided to an agent 525a-n for handling. For example, a telephone interaction may be provided to a single agent for direct interaction with a customer, or an email interaction may be provided to a group of agents for resolution, such as when multiple tasks need to be performed in parallel or when a collaborative effort may be required. A scheduling server 531 may be utilized to maintain and operate on a plurality of agent schedules, for example comprising agent availability times when an agent is scheduled to work and be available to receive interactions, meetings, training sessions, or other such events. A queueing server 532 may be used to monitor the current state of agents, and to operate on agent states, for example to update agent availability, skills, training, language capabilities, or any other agent-specific state information that may be relevant within a contact center environment such as for making routing determinations for inbound interactions. Scheduling server 531 may operate on a schedule through the use of scheduling events, wherein a scheduling event comprises a particular change to be made to a schedule for a particular agent (that is, each scheduling event corresponds to a single discrete scheduling change to be performed). These scheduling events may also be provided to a queueing server 532 that may then directly alter an agent's current state based on a received scheduling event, for example to automatically place an agent in an unavailable state (so they no longer receive interactions) so they may receive "on the fly" training, or to automatically update an agent's associated skill sets to reflect recent training received or a reorganization of skill descriptions (or any other such skills-related change that may necessitate altering an agent's state), so that they may immediately begin participating in interactions associated with the new skills.

According to the embodiment, a cloud-based analytics server 710 may be utilized in addition to or in place of an analytics server operated by a contact center (as described previously, referring to FIG. 5) by communicating with systems operated by a contact center (as described above) via a network. For example, a cloud-based analytics server 710 may be operated by a third-party vendor providing interaction analysis via a network in a "software-as-a-service" (SaaS) business model, or may be operated by a business in an offsite location physical separate from a contact center operated by the same business, for example to service multiple contact centers using a single analytics server 710. Analytics server 710 may receive communication from components, for example customer interaction information from an IVR 521, telephony information from a CTI server 527 or ACD 522, customer account information from a customer relations management (CRM) server 526, or agent or interaction information from an agent workstation 525a-n. According to a particular arrangement, a variety of contact center systems (such as, for example, CRM server 526) may communicate via a network 701 using a variety of communication adapters suited to their particular use, such as using a software application programming interface (API) to facilitate communication between CRM server 526 and analytics server 710 via network 501. In this manner, it may be appreciated that analytics may be performed via a network 701, and may optionally be provided by a third party to a plurality of contact centers as clients.

Such an arrangement may optionally be utilized in addition to a distributed contact center arrangement described above (referring to FIG. 6), facilitating a distributed contact center environment where agents may operate over a network and analysis may also be performed via a network. Such distributed and cloud-based arrangements may be desirable, for example, to accommodate analysis and real-time scheduling operation in an existing contact center without the need for expensive or time-consuming architecture changes, and in this manner it can be appreciated that the analysis and scheduling features described may easily be added to any contact center regardless of physical, geographic, or network arrangement or system components or agents.

Figure 8:
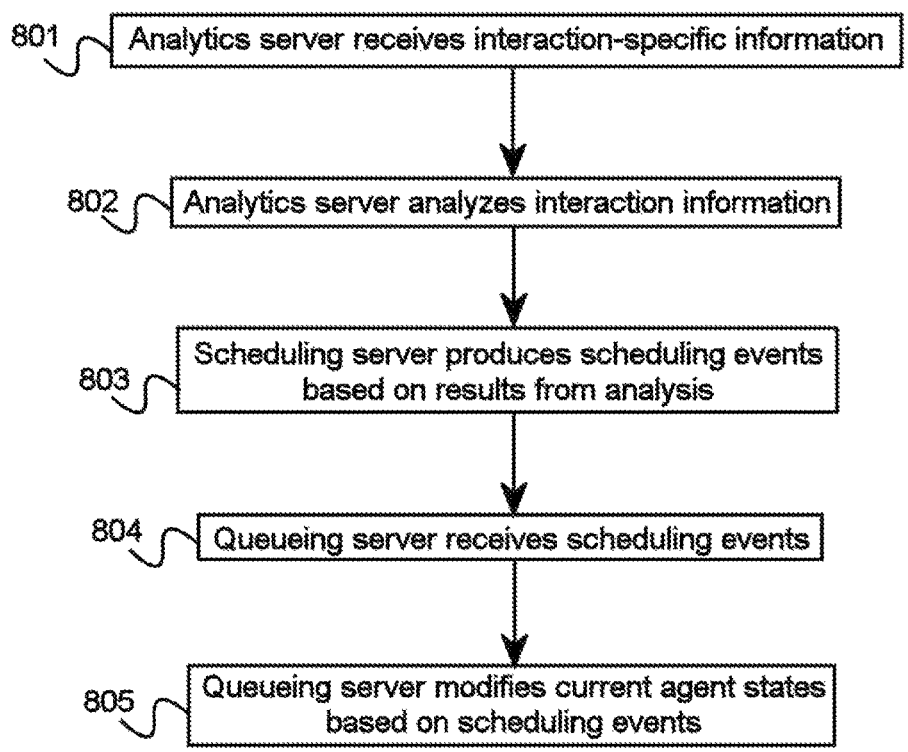
FIG. 8 is a flow diagram illustrating an exemplary method for automatically scheduling contact center agents using real-time analytics, according to a preferred embodiment of the invention.

FIG. 8 is a flow diagram illustrating an exemplary method 800 for scheduling contact center agents using automated analytics, according to a preferred embodiment of the invention. In an initial step 801, an analytics server may receive a plurality of interaction-specific information, for example stored email messages from an email-based interaction, or speech-based audio information being monitored from a telephone interaction currently in progress. In a next step 802, the analytics server may analyze at least a portion of the interaction-specific information, for example by performing text-based analysis of email messages or speech analysis of audio data. The results of analysis, for example including key words or phrases identified, interaction-specific details such as customer information or interaction topic, or technical details such as agent software utilization, may be provided to a scheduling server for use in producing scheduling events. In a next step 803 the scheduling server may produce a plurality of scheduling events based at least in part on at least a portion of the analysis results, for example a scheduling event comprising instructions to modify a particular agent's schedule to email a customer back to continue an interaction at a requested time, or to modify a particular agent's current status to make them unavailable for receiving interactions (for example so that they may receive immediate training or attend an urgent meeting). In a next step 804 a queueing server may receive at least a portion of the plurality of scheduling events, and in a final step 805 may modify the current state of at least a portion of a plurality of agent workstations based at least in part on at least a portion of the plurality of scheduling events. In this manner, it may be appreciated that agent performance and interaction details may be continually analyzed both in real-time and at a later time (for example, to analyze a body of existing data periodically or upon implementation or configuration of a new system component), and analysis may be used to automatically modify agent schedules as well as current agent states, providing automated scheduling as well as immediate-action status and scheduling changes.

Figure 9:
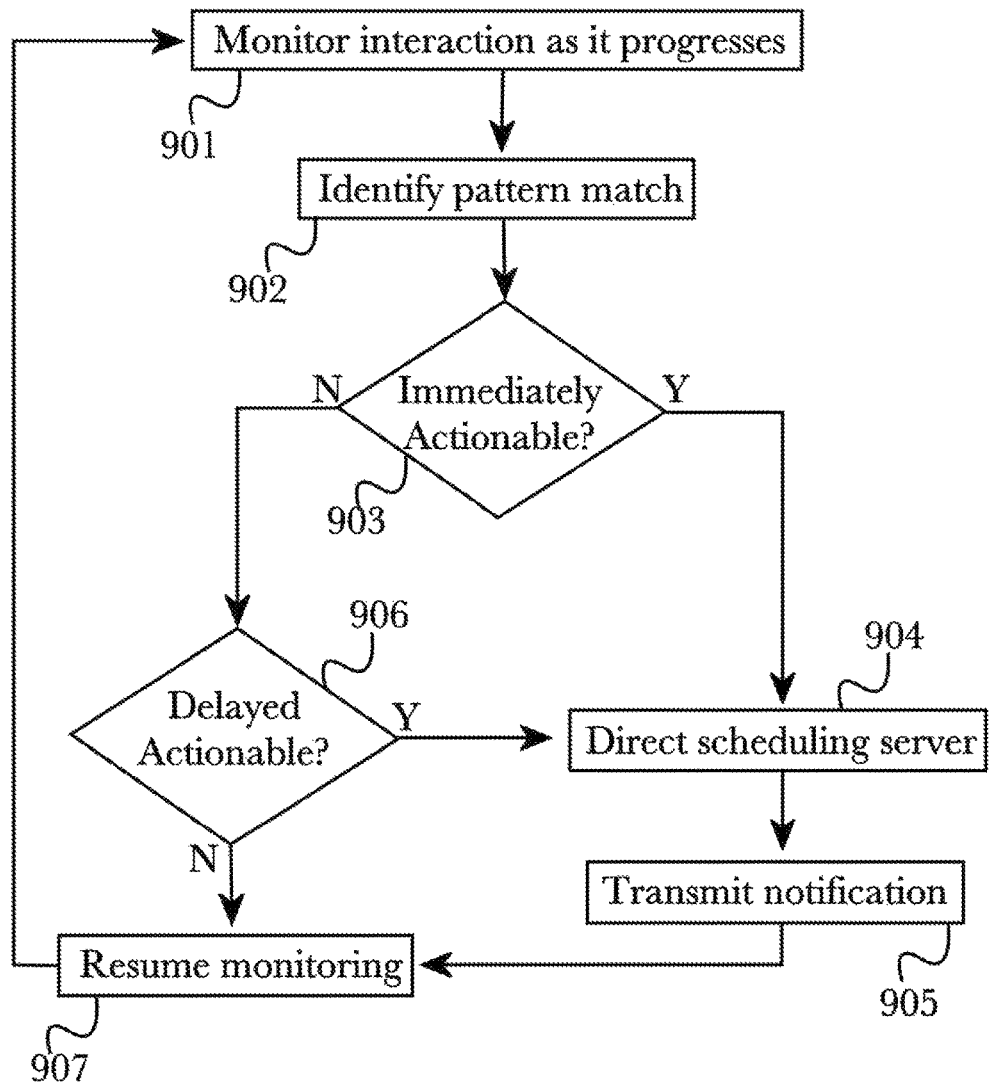
FIG. 9 is a flow diagram illustrating an exemplary method for using real-time analytics to identify immediate event triggers, according to a preferred embodiment of the invention.

FIG. 9 is a flow diagram illustrating an exemplary method 900 for using real-time analytics to identify immediate event triggers, according to a preferred embodiment of the invention. In an initial step 901, an analytics server 530 (as described above, referring to FIG. 5) may monitor an interaction as it occurs in real-time. In a next step 902, a pattern match may be recognized, such as a section of text or speech, or a particular trait or set of traits such as speech cadence or tone. A recognized pattern match may then be compared to known configuration parameters to determine whether immediate action is required 903, and if so a scheduling server may be directed 904 accordingly and the appropriate parties (such as a supervisor) notified 905. For example, if an agent uses restricted vocabulary during a customer interaction (such as recommending a competitor's product or swearing at a customer), a scheduling server may be directed to schedule the agent for immediate coaching and remove them from a call queue, and their supervisor or training staff (or both) may be notified.

If a pattern match is not immediately actionable, configuration may be checked to determine whether action is still required 906. For example, if a customer expresses an interest in cancelling their account, immediate action may not be warranted but a follow-up call may be scheduled to try and remedy the situation or to verify that the agent was able to resolve their concerns to their satisfaction. If no action (immediate or delayed) is required, or after performing any required actions, analytics server may then resume normal monitoring 907 and operation continues.

The skilled person will be aware of a range of possible modifications of the various embodiments described above. Accordingly, the present invention is defined by the claims and their equivalents.

What is claimed is:

1. A system for automatically scheduling contact center agents using real-time analytics, comprising:
    an analytics server comprising at least a plurality of programming instructions stored in a memory and operating on a processor of a network-connected computing device and configured to receive at least a plurality of interaction-specific information from a plurality of contact center systems, and configured to automatically analyze at least a portion of the plurality of interaction-specific information for generating a result, and configured to provide said result to a scheduling server;
    a scheduling server comprising at least a plurality of programming instructions stored in a memory and operating on a processor of a network-connected computing device and configured to maintain a schedule for each of a plurality of contact center agents, the schedule comprising at least a plurality of work items and a plurality of time-based scheduling information, and configured to receive a plurality of analysis information from an analytics server, and configured to automatically produce a plurality of scheduling events based at least in part on at least a portion of the received analysis information, and configured to operate on at least an agent schedule based at least in part on a portion of the plurality of scheduling events;
    and an agent queuing server comprising at least a plurality of programming instructions stored in a memory and operating on a processor of a network-connected computing device and configured to receive at least a plurality of agent-specific information from a plurality of agent workstations, the agent-specific information comprising at least an agent's current status, and configured to operate on at least a portion of a plurality of agent workstations to configure at least an agent's current status, the configuration being based at least in part on an agent schedule;
    wherein the agent queuing server, on receipt of a notification from the scheduling server, places an agent's current status to an unavailable state within a call queue and schedules immediate training for the agent;
    wherein the notification is based on a recognized pattern, by the analytics server, from the plurality of interaction-specific information.

2. The system of claim 1, wherein the agent queuing server is further configured to receive a plurality of scheduling events from the scheduling server, and to operate on at least a portion of a plurality of agent workstations to configure at least an agent's current status, the configuration being based at least in part on at least a portion of the plurality of scheduling events.

3. The system of claim 1, wherein the plurality of interaction-specific information comprises at least a plurality of speech-based audio data.

4. The system of claim 3, wherein the analytics server is configured to perform speech analysis on at least a portion of the plurality of speech-based audio data.

5. A method for automatically scheduling contact center agents using real-time analytics, comprising the steps of:
    receiving, at an analytics server comprising at least a plurality of programming instructions stored in a memory and operating on a processor of a network-connected computing device, a plurality of interaction-specific information;
    analyzing, using automatic operation of the analytics server, at least a portion of the interaction-specific information for generating a result;
    automatically producing, using a scheduling server comprising at least a plurality of programming instructions stored in a memory and operating on a processor of a network-connected computing device, a plurality of scheduling events based at least in part on said result;
    receiving, at an agent queuing server comprising at least a plurality of programming instructions stored in a memory and operating on a processor of a network-connected computing device and configured to receive at least a plurality of agent-specific information from a plurality of agent workstations, the agent-specific information comprising at least an agent's current status, and configured to operate on at least a portion of a plurality of agent workstations to configure at least an agent's current status, the configuration being based at least in part on an agent schedule, at least a portion of the plurality of scheduling events; and modifying the current state of at least a portion of a plurality of agent workstations, the modification being based at least in part on at least a portion of the plurality of scheduling events;

wherein in the modifying step comprises the agent queuing server, on receipt of a notification from the scheduling server, placing an agent's current status to an unavailable state within a call queue and scheduling immediate training for the agent;

wherein the notification is based on a recognized pattern, by the analytics server, from the plurality of interaction-specific information.

* * * * *